Dec. 11, 1945.      R. F. WARREN, JR      2,390,759
LOCK NUT
Filed March 15, 1944
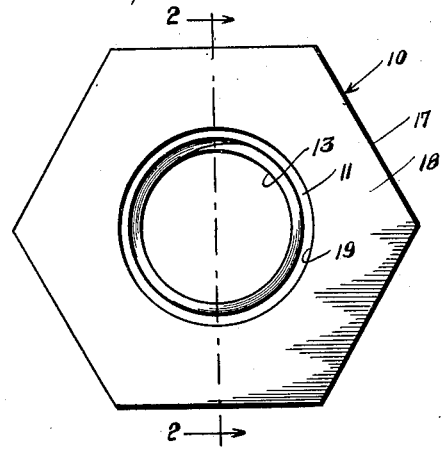
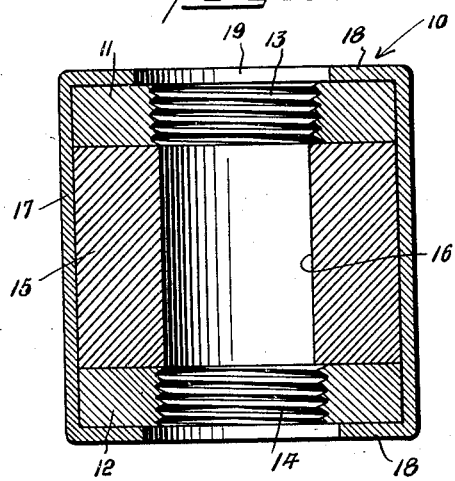
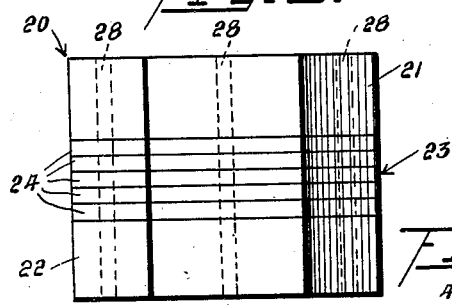
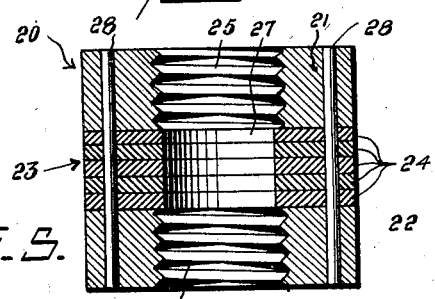
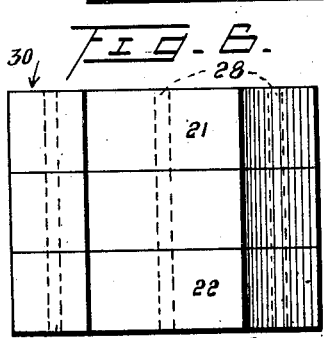
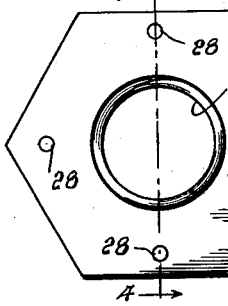
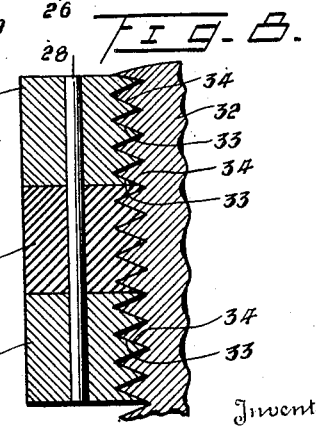
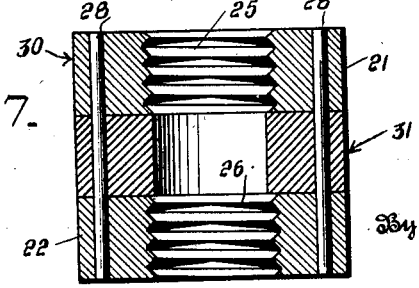
Inventor
RICHARD F. WARREN, JR.,
John H. Hanrahan
Attorney Patented Dec. 11, 1945

2,390,759

UNITED STATES PATENT OFFICE 2,390,759

LOCK NUT

Richard F. Warren, Jr., Stratford, Conn.

Application March 15, 1944, Serial No. 526,539

9 Claims. (Cl. 151—7)

This invention relates to new and useful improvements in lock nuts.

The objects and advantages of the invention will become apparent from a consideration of the following detailed description taken in connection with the accompanying drawing wherein satisfactory embodiments of the invention are shown. However, it is to be understood that the invention is not limited to the details disclosed but includes all such variations and modifications as fall within the spirit of the invention and the scope of the appended claims.

In the drawing—

Fig. 1 is a top plan view of a lock nut constructed in accordance with the invention;

Fig. 2 is a vertical central sectional view taken as along the plane of the line 2—2 of Fig. 1;

Fig. 3 is a side elevational view showing a modified construction of lock nut;

Fig. 4 is a vertical central sectional view taken as along the line 4—4 of Fig. 5;

Fig. 5 is a top plan view of the nut of Figs. 3 and 4;

Fig. 6 is a side elevational view of another modification of lock nut;

Fig. 7 is a vertical central sectional view through the nut of Fig. 6; and

Fig. 8 is an enlarged detail sectional view illustrating the nut of Figs. 6 and 7 on a bolt, the parts being exaggerated in some particulars.

Referring in detail to the drawing and at first more particularly to Figs. 1 and 2 the lock nut of the invention is generally designated 10 and includes spaced outer metal parts 11 and 12 each shown as hexagonal in plan although such shape is not a feature of the invention and the parts may be square or the like as desired. Parts 11 and 12 have tapped openings 13 and 14 respectively and the thread of one part is a continuation of the thread of the other part. That is, the thread in opening 13 is a continuation of the thread in opening 14 (and vice versa) the same as would result if a tapped nut were sliced in half to provide the parts 11 and 12.

Intermediate the parts 11 and 12 is a part 15 preferably of a plastic material as will appear. Part 15 has an unthreaded opening 16 therethrough of less than the minor diameter of the threads of openings 13 and 14 and at most of less diameter than the major diameter of said threads. In fact the diameter of the hole 16 may be the same as that of the diameter of the holes 13 and 14 measured across the minor diameter of their threads. Part 15 is shown as of a thickness greater than the combined thickness of the parts 11 and 12 although this is not essential.

Part 15 is of the size of the parts 11 and 12 and is also hexagonal in plan so that when the parts are arranged with their openings 13, 14 and 16 in register their outer edges are flush with one another. A metal shell 17 is spun or otherwise fitted about the edges of the parts 11, 12 and 15 whereby to maintain them against relative turning movement and to keep them aligned in the manner mentioned. Shell 17 includes inner and outer ends 18 disposed against the outer ends of the parts 11 and 12 whereby the latter are maintained against the outer sides of the part 15. Ends 18 have openings 19 aligned with the openings 13, 14 and 16 but of slightly greater diameter than the latter whereby not to interfere with the threading of the nut 10 onto a bolt.

When using the nut 10 the same is threaded onto a bolt in the usual manner. If the nut is threaded to have the part 12 first engage the bolt, then as the nut is threaded onto the bolt and the bolt engages the part 15 the threads of the bolt form a thread in the latter part. The threads so formed will be continuations of the thread of part 12 and then as the bolt and nut are further threaded together the threads of part 11 will be engaged with those of the bolt. The nature of the part 15 will later be further considered but here it is noted that such part is a plastic into which the bolt threads may press but the plastic is somewhat resilient and grips the bolt.

Referring now to Figs. 3, 4 and 5 the nut there generally designated 20 includes outer metal parts 21 and 22 and an intermediate part 23 in the form of a series of relatively thin elements, individually designated 24. The part 23 is of plastic material as is the part 15 of nut 10 and this feature of the nut 20 will later be considered in detail. Parts 21 and 22 are provided with threaded openings 25 and 26 and the part 23 has an unthreaded opening 27 therethrough. Opening 27 in its relation to openings 25 and 26 bears the same relation as that existing between the opening 16 of part 15 and the openings 13 and 14 of the parts 11 and 12 of nut 10. In addition it is noted that the threads of the parts 21 and 22 are continuations of one another.

The parts 21 and 22 are secured against opposite sides of the part 23 with the openings 25, 26 and 27 of the respective parts in register. Metal pins 28 are passed through the three parts at the desired spaced points and secure the parts in the relation indicated and against relative movement. Part 23 is of the size of parts 21 and 22 whereby a wrench or the like applied to nut 20 for the purpose of holding or turning the same will equally grip all the parts, their outer surfaces being flush with one another. Preferably pins 28 have tight or force fit through openings provided to receive them in the various nut parts and particularly in the outer metal parts 21 and 22.

Figs. 6 and 7 show a nut generally designated 30 and comprising a slight modification of the nut 20 of Figs. 3, 4 and 5. Nut 30 includes the outer metal parts 21 and 22, an intermediate non-metallic part 31 and the pins 28 passing through and securing all the parts together with the metal parts against the outer sides of the intermediate plastic part. Nut 30 is the same as nut 20 with the exception that the intermediate part 31 of nut 30 comprises a single integral piece whereas the intermediate part 23 of nut 20 is a laminated structure comprising a number of the elements 24.

In Fig. 8 the nut 30 is shown threaded onto a bolt 32 and it is noted that the intermediate plastic part 31 tends to separate the nut and bolt or to resist threading of the nut onto the bolt. The result is that the outer surfaces 33 of the nut threads are jammed against the inner surfaces 34 of the bolt threads locking the nut and bolt together against casual relative turning movement. Further, the plastic intermediate part 31 tends to adhere to the bolt threads. Nuts 10 and 20 lock onto a bolt in the same manner as described in connection with nut 30.

The intermediate part of each of the nuts disclosed, i. e., the intermediate parts 15, 23 and 31, are of a material into which the threads of the bolt may form a thread merely by pressing portions of the material out of the way. The bolt threads do not cut away any of the material of the said intermediate parts but merely press the threads therein. Preferably the intermediate nut parts are formed of a hard vinyl chloride containing a minimum of plasticizer although as will appear other plastic materials may be used.

Where the parts are solid as in Figs. 1, 2, 6 and 7 the intermediate parts may be molded. When the intermediate part is of laminated construction the individual elements 24 may be punched from sheets of the chosen material. When the laminated intermediate parts are made up of pieces punched from sheets the said parts seem to be tougher and more fibre forming and better serve to grip a bolt onto which the nut may be threaded. This is probably due to some orientation taking place in the material during the rolling of the sheet and the punching out of the elements.

When the locking insert or intermediate part is wholly within the nut body and spaced from both ends thereof as in Figs. 1 and 2 the insert cannot, while the nut is in use on a bolt, be contacted by oil or other material likely to soften or loosen it. In addition nuts heat up when in use in places where they are subject to rapid vibration and in some instances they are used in places where they are subject to heat. Therefore if the insert 15 is of a thermoplastic material and should become softened by heat, even to the flow point, the material of the insert may not escape from its proper place in the nut. It is noted that under heat the thermoplastic resins expand and therefore when the present lock nut has an insert of such material a bolt to which the nut is applied will be gripped tighter as the insert becomes heated. Somewhat the same results may be obtained with the nuts 20 and 30 when their inserts are of thermoplastic material although they should not be used in connections where they are subjected to excessive heat.

Thermosetting materials may be used in the various forms of the lock nut of the invention and for some purposes are advantageous. It is impervious to moisture, will withstand higher temperatures without deformation or decomposition, has higher compressive strength and is cheaper to use by reason of the fact that it may be more effectively loaded with fillers. The thermosetting materials may be reenforced with fibrous materials and will maintain such fibres in place more effectively than many thermoplastic materials.

In each of the nuts disclosed there is a surplus of material in each insert and it is into such surplus that the bolt threads form a thread. In the present nut as made there is no thread in the locking inserts. When the nut is threaded onto a bolt the threads of the latter form a thread in the insert by displacement of some of the material thereof. As the plastic material of the inserts is preferably somewhat elastic it tends to return to its original shape or condition when the nut is removed from a bolt and therefore while the nut is on a bolt the insert grips the latter.

The invention is not limited to the use of hard vinyl chloride. Other plastics may be used and as a rule have considerable vibration absorbing properties. Generally speaking the intermediate nut parts comprise organic plastic materials and certain of these materials may be used alone while others may be used only in combination with one or more other materials to make a harder or softer and/or a tougher material or mixture. For example, cellulose and its derivatives while in alpha and beta stage may be used as fillers and to toughen the material. It is preferred that the material of the intermediate nut parts be resistant to bacteria and fungus growth whereby it is not subject to decay through biochemical attack, that it have a relatively high softening point, that it be water-proof or substantially so and that it have a certain elasticity and fibre forming characteristics. Various combinations of the herein disclosed materials may be mixed for the purpose of imparting to the mass the desired characteristics. Many of the materials falling within the scope of the present disclosure are chemically incompatible with one another but are mechanically miscible to form a homogeneous mass which may be fabricated to provide the intermediate parts of the nut of the invention.

Various synthetic resins may be used for the making of the intermediate part of the nut of the invention. That is, I may use (1) phenol-aldehydic resins, (2) amino-aldehydic resins, (3) hydroxy-carboxylic resins, (4) sulphonamide resins, (5) resins from sugar, (6) vinyl resins including resins from vinyl derivatives, (7) indene resins, and (8) lignin plastic substances. I may also use natural and synthetic plastics, cellulose and its derivatives, protein plastic substances and petroleum plastic derivatives. Fillers may be used with various of these materials, and may be in the form of powders or fibres. Thus Micarta may be used for my purpose.

Certain of the materials named are too hard and brittle to be used alone for my purpose as they are likely to crack or fracture under vibration and strain. With these materials I mix other softer materials to lend resiliency and toughness to the mass. Other materials herein included are alone too soft and have too low a heat softening point for my present purpose. With the latter materials I mix other and harder materials to raise their heat softening point and to add materially to their hardness.

Among the resins under type 1 above, I include resins such as phenol formaldehyde, cresol and cresylic acid, other tar acids and formaldehydes, phenol furfuraldehyde or other tar acids and other aldehydes. Under type 2 is included urea and formaldehyde resins, and aniline resins obtained by condensing aniline and formaldehyde and other anilines or amines and other aldehydes.

Under type 3 I include materials produced by the esterification of polybasic acids and polyhydric alcohols. Such materials are frequently called alkyd resins, this title including adipic acid resins obtained by the condensation of adipic acid and glycerin or by the condensation of glycerin with phthalic anhydride. Type 4 includes the sulphonamide resins developed from para toluensulphonamide. The resins from sugar (type 5) above, are obtained by condensing saccharide with aldehydes and urea.

Type 6, the vinyl resins including resins from vinyl derivatives are best suited for my purpose. These include vinylidene chloride (sold commercially as Saran); vinyl ester; vinyl chloride (having very desirable heat transfer properties); acrylic resins from vinylcarbonic acid ester; vinyl carbonic acid; vinyl benzole or polystyrol; divinyl or butadiene; vinylester or vinyl chloride; copolymerized polyvinyl chloride and polyvinyl acetate (known commercially as Vinylite); vinyl acetate; polymers of vinyl halides combined with different percentages of plasticizers (known commercially as Koroseal); the commercial material known as Vistanex (when used with other harder materials) comprising polyiso butylene polymerized with boron trifluoride and also comprising polyiso butadiene having a tacky to rubber-like structure; the commercial products known as Vinyon; Butacite; and Rezyl (comprising respectively a copolymer of polyvinyl chloride and polyvinyl acetate; a reaction product of vinyl acetate resin with butyraldehyde; and resulting from the fact that the introduction of unsaturated resinous ester of the maleate polyester type into a compound of the type (R—CH=CH2) has the property of curing the latter; vinyl aceto butyrate; vinyl butyrate; the polymers of ester of acrylic acid known commercially as Plexigum; polymers of the esters of methacrylic acids such as the polymethacrylic resin sold as Lucite; isobutyl methacrylic resins; certain plastics obtained by mixing the monomer of styrene with vinylidene chloride and ethylene glycol and maleic acid and copolymerizing the mixture; styrene and in addition thereto the resins known as polystyrene.

Resins of the indene group (type 7) include polyindene and poly-cumaron. Under type 8 I include lignin and its derivatives extracted from paper mill waste waters and other sources. The lignin may be separated into various chemical components of no value to me here but also into colored gums and by various treatments into clear transparent resins useful for my present purpose. Lignin is hydrogenated with Raney nickel catalyst, in aqueous solution yielding methanol, propylcyclohexane, hydroxy propylcyclohexames, and a colorless resin which may again be separated into an alkali soluble in an alkali insoluble component. I use either of these components in the making of the various intermediate parts herein disclosed.

Under the heading of natural and synthetic plastics I include balata, rubber, gutta percha and latex to be used alone or in combination with other plastics. As the synthetic plastics I mention polymerized chloroprene (of the type sold as Neoprene); the copolymers including butadiene (of the type sold as Buna and Perbunan); polymethylene polysulphide (of the type sold as Thiokol); chlorinated rubber (of the type sold as Tornesit); rubber hydrochloride (of the type sold as Pliofilm); the isomerized hubber (sold as Plioform) and any latex of these.

Under the heading of cellulose and its derivatives I include cellulose acetate; regenerated cellulose; synthetic cellulose; cellulose xanthate; benzylcellulose; ethylcellulose; cellulose hydrate; celluose triacetate; cellulose acetobutyrate; cellulose acetopropionate; hydrolyzed cellulose acetate and others of the cellulose esters and ethers. Most of these materials may be used alone and certain of them for mixing with other materials to provide a tough mixture. Gel cellulose may also be used.

Nitrocellulose compounded with other materials of less flammable nature or of a nature to prevent flammability may be used. Halowax or the like may be used for compounding with the nitrocellulose. Other inflammable plasticizers which may be compounded with nitrocellulose for my purpose are monophenyl phosphate, triphenyl phosphate and di(paratertiary butyl phenyl) mono 15 tertiary butyl 2 xenyl phosphate. The flammable nature of nitrocellulose may be weakened or lessened by mixing with varying proportions of cellulose acetate.

Under the heading of protein plastic substances I include casein plastic products as well as polypentamethylene sebacamide sold as Nylon and the group of compounds of which at least one is obtained by the condensation polymerization from a diamine and dibasic carboxylic acid and of which one is sold under the trade-mark Exton. Collegen plastics are also in this heading of protein plastics. Resins from coffee are believed to fall under this heading.

The petroleum plastic derivatives include those gums or resins obtained by the oxidation or controlled polymerization of certain distillates of petroleum cracking. Those plastics falling under this heading and known as Santoresins are clear, hard, neutral products resistant to alkalis, acids, alcohol and water. Petropol is a softer type of the same material. Both may be used for my present purpose but it is preferred that Petropol be used with some harder brittle material as with one of the condensation resins to provide an insert having the desired characteristics as to toughness, resiliency, high heat flow point, etc.

While all of the above named plastics may be used alone or in combination with other materials to provide an insert or intermediate part as herein disclosed, there are questions of locations that enter into the problem as to what plastic should be used in any particular instance. Some of the plastics have a higher softening point, others are more inert, etc., and so the plastic used in any particular instance should be determined by the conditions under which the lock nut is to be used. For best results the chemical environment should be considered. The metal of the nut would be determined in the same way. Some of these plastics swell when wet and thereafter on drying are likely to fall to pieces. Plastics having such characteristics should not be employed in nuts which are to be reused.

The intermediate parts of the nuts of the invention being made of a material as above disclosed will not dry out while being stored and before use. Further the part is not subject to attack by micro-organisms and so will not decay through biochemical attack. In addition the material preferably used has a relatively high heat softening point and this is of importance since where the nut in use is subjected to rapid vibration considerable heat is generated.

When the nut of the invention is threaded onto a bolt the threads of the latter are not distorted or mutilated. There is merely a compressing of the material of the intermediate nut part whereby the latter grips the bolt shank and casual unthreading of the nut from the bolt is prevented.

However the nut may be removed from the bolt through the use of a wrench and the nut may again be used as a lock nut. It is noted in a nut that has been removed from a bolt after a period of use that the threads remain impressed in the intermediate nut part and that the material of the part engaged by the bolt shank has become fibrous. In this connection attention is directed to the fact that many of the various materials herein disclosed are fibre forming in character.

A material comprising a mixture of thermoplastic and thermo-setting plastics is useful. In such a mixture the thermo-setting material should be in its secondary stage prior to use of the nut; then, when the nut is employed in a hot location or is subjected to rapid vibration while in use the thermo-setting portion of the mixture reaches a final stage of cure while in actual use. As the thermo-setting portion of the mixture cures or sets up it becomes harder and holds the nut to the bolt. The thermo-plastic portion of the mix will, if sufficiently heated, become so soft as to become nearly a lubricant but the nut will be held to the bolt by the set thermo-setting material of the mix if the conditions as to heat should prevail.

Having thus set forth the nature of my invention, what I claim is:

1. In a lock nut, a pair of spaced metal parts each having a threaded opening therethrough, an intermediate non-metallic part having an unthreaded opening therethrough, means securing the metal parts against opposite sides of the intermediate part and maintaining all said parts relatively fixed with their openings in register, and said non-metallic part of a material adapted to have a thread formed therein by the threads of a bolt onto which said nut may be threaded.

2. In a lock nut, a pair of spaced metal parts each having a threaded opening therethrough, an intermediate non-metallic part having an unthreaded opening therethrough, a metal shell about the sides of all said parts and the outer ends of said metal parts and maintaining all said parts against one another and with their openings in registry, said metal shell in its ends having openings aligned with those of the parts and of somewhat greater diameter than the latter, and said non-metallic part of a material adapted to have a thread formed therein by the threads of a bolt onto which said nut may be threaded.

3. In a lock nut, a pair of spaced metal parts each having a threaded opening therethrough, said openings of the same diameter and with the threads of one comprising a continuation of those of the other, an intermediate non-metallic part between and engaged at its opposite sides by said metal parts and having an opening in alignment with the openings through the metal parts, said opening in the non-metallic part of less diameter than the major diameter of the opening of a metal part, means securing said parts together in the relation described, and said non-metallic part of a material adapted to have a thread formed therein by the threads of a bolt onto which said nut may be threaded.

4. In a lock nut, a pair of spaced metal parts each having a threaded opening therethrough, said openings of the same diameter and with the threads of one comprising a continuation of those of the other, an intermediate non-metallic part between and engaged at its opposite ends by said metal parts and having an opening in alignment with the openings through the metal parts, said opening in the non-metallic part of less diameter than that of the opening of a metal part measured across the valley of a thread, a metal shell about the sides of all of said parts and the outer ends of said metal parts and maintaining said metal parts against said non-metallic part and all of said parts relatively fixed with their openings aligned, said metal shell at its ends having openings aligned with those through the parts and of somewhat greater diameter than the latter, and said non-metallic part of a material adapted to have a thread formed therein by the threads of a bolt onto which the nut may be threaded.

5. In a lock nut, a pair of spaced metal parts each having a threaded opening therethrough, said openings of the same diameter with the threads of one comprising a continuation of those of the other, an intermediate non-metallic part between and engaged at its opposite ends by said metal parts and having an opening in alignment with the openings through the metal parts, said opening through the non-metallic part of less diameter than that of the opening of a metal part measured across the valley of a thread, means passing through all of said parts and maintaining them in the relation indicated, and said non-metallic part of a material adapted to have a thread formed therein by the threads of a bolt onto which the nut may be threaded.

6. In a lock nut, a pair of spaced metal parts each having a threaded opening therethrough, an intermediate non-metallic part having an unthreaded opening therethrough, means passing through all of said parts in spaced relation to said openings and maintaining the metal parts against the respective outer ends of the non-metallic part and all of said parts with their openings in register with one another, and said non-metallic part of a material adapted to have a thread formed therein by the threads of a bolt onto which the nut may be threaded.

7. In a lock nut, a pair of spaced metal parts each having a threaded opening therethrough, an intermediate part of a hard vinyl chloride containing a minimum of plasticizer having an unthreaded opening therethrough, means securing said metal parts against opposite ends of the intermediate part and maintaining all of said parts relatively fixed with their openings aligned, and said intermediate part adapted to have a thread formed therein by the threads of a bolt onto which the nut may be threaded.

8. In a lock nut, a pair of spaced metal parts each having a threaded opening therethrough, said openings of the same diameter and with the threads of one comprising continuations of those of the other, an intermediate part of a hard vinyl chloride containing a minimum of plasticizer between and engaged at its opposite ends by said metal parts and having an opening in alignment with the openings through the metal parts, said opening in the intermediate part of less diameter than the opening of a metal part measured across the valley of a thread, means securing all of said parts together in the relation described, and said intermediate part adapted to have a thread formed therein by the threads of a bolt onto which the nut may be threaded.

9. In a lock nut, a pair of spaced metal parts each having a threaded opening therethrough, an intermediate part of a non-metallic heat expansible material having an unthreaded opening therethrough, means securing said metal parts against opposite ends of said intermediate part and maintaining all of said parts relatively fixed with their openings aligned, and said intermediate part adapted to have a thread formed therein by the threads of a bolt onto which the nut may be threaded.

RICHARD F. WARREN, Jr.